US008572420B2

(12) United States Patent
Dutton et al.

(10) Patent No.: US 8,572,420 B2
(45) Date of Patent: Oct. 29, 2013

(54) POWER MANAGED USB FOR COMPUTING APPLICATIONS USING A CONTROLLER

(75) Inventors: Drew J. Dutton, Austin, TX (US); James R. MacDonald, Buda, TX (US); Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1532 days.

(21) Appl. No.: 11/071,961

(22) Filed: Mar. 4, 2005

(65) Prior Publication Data

US 2005/0160196 A1    Jul. 21, 2005

Related U.S. Application Data

(63) Continuation-in-part of application No. 10/762,684, filed on Jan. 20, 2004, now Pat. No. 7,086,583.

(51) Int. Cl.
*G06F 3/00* (2006.01)

(52) U.S. Cl.
USPC ............. 713/323; 713/300; 713/310; 710/10; 710/14; 710/18; 710/19; 710/52; 710/59; 710/313

(58) Field of Classification Search
USPC .......................................................... 710/10
See application file for complete search history.

(56) References Cited

U.S. PATENT DOCUMENTS

| 4,390,964 A | 6/1983 | Horky et al. |
| 5,541,985 A | 7/1996 | Ishii et al. |
| 5,630,081 A | 5/1997 | Rybicki et al. |
| 5,786,769 A | 7/1998 | Coteus et al. |
| 5,793,359 A | 8/1998 | Ushikubo ...................... 345/169 |
| 5,815,426 A | 9/1998 | Jigour et al. |
| 5,841,654 A | 11/1998 | Verissimo et al. |
| 5,877,483 A | 3/1999 | Bilich et al. |
| 5,953,511 A | 9/1999 | Sescila, III et al. ........... 710/315 |
| 6,000,607 A | 12/1999 | Ohki et al. |

(Continued)

FOREIGN PATENT DOCUMENTS

| EP | 693723 A1 * | 1/1996 |
| JP | 07-334633 | 12/1995 |

(Continued)

OTHER PUBLICATIONS

'Universal Serial Bus Specification' Revision 2.0 Compaq et al. Apr. 27, 2000 pp. 21,32,33,60,65,66,80,156.*

(Continued)

*Primary Examiner* — Steven Snyder
(74) *Attorney, Agent, or Firm* — King & Spalding L.L.P.

(57) ABSTRACT

In various embodiments, a computer system may include a computer controller to send and/or receive sideband signals to/from a USB device. In some embodiments, the USB device may include a USB controller to send/receive sideband signals to/from the computer controller. The computer controller and USB controller may allow communications between the computer system and the USB device when either of the computer system or USB device is in a low power state. The sideband signal sent between the computer system and the USB device may trigger the other of the computer system or USB device to enter a normal power state. In some embodiments, the computer controller and/or USB controller may be further coupled to a memory to buffer data to be sent to the computer system or USB device after the computer system or USB device returns to a normal power state.

29 Claims, 10 Drawing Sheets

(56) References Cited

U.S. PATENT DOCUMENTS

| | | | |
|---|---|---|---|
| 6,012,103 A * | 1/2000 | Sartore et al. | 710/8 |
| 6,168,077 B1 | 1/2001 | Gray et al. | |
| 6,230,277 B1 | 5/2001 | Nakaoka et al. | |
| 6,279,060 B1 | 8/2001 | Luke et al. | 710/64 |
| 6,317,839 B1 | 11/2001 | Wells | 713/320 |
| 6,349,878 B2 | 2/2002 | Imai | |
| 6,389,544 B1 | 5/2002 | Katagiri | 713/300 |
| 6,405,362 B1 | 6/2002 | Shih et al. | 717/174 |
| 6,408,351 B1 * | 6/2002 | Hamdi et al. | 710/63 |
| 6,435,904 B1 | 8/2002 | Herbst et al. | 439/534 |
| 6,438,638 B1 | 8/2002 | Jones et al. | |
| 6,460,106 B1 * | 10/2002 | Stufflebeam | 710/304 |
| 6,460,143 B1 | 10/2002 | Howard et al. | |
| 6,467,042 B1 | 10/2002 | Wright et al. | 713/320 |
| 6,505,267 B2 | 1/2003 | Luke et al. | 710/315 |
| 6,510,524 B1 | 1/2003 | Osborn et al. | 713/323 |
| 6,519,669 B1 | 2/2003 | Yanagisawa | 710/304 |
| 6,557,754 B2 | 5/2003 | Gray et al. | |
| 6,598,100 B2 | 7/2003 | Shu et al. | |
| 6,601,180 B1 | 7/2003 | Paredes et al. | 713/323 |
| 6,654,841 B2 | 11/2003 | Lin | |
| 6,662,258 B1 * | 12/2003 | Lukanc et al. | 710/308 |
| 6,681,991 B1 | 1/2004 | Li | 235/439 |
| 6,714,215 B1 | 3/2004 | Flora et al. | |
| 6,714,891 B2 * | 3/2004 | Dendinger | 702/132 |
| 6,738,068 B2 * | 5/2004 | Cohen et al. | 345/519 |
| 6,804,740 B1 * | 10/2004 | Watts, Jr. | 710/303 |
| 6,910,627 B1 | 6/2005 | Simpson-Young et al. | |
| 6,928,562 B2 | 8/2005 | Cohen et al. | |
| 6,945,454 B2 | 9/2005 | Tournemille et al. | |
| 6,990,549 B2 | 1/2006 | Main et al. | |
| 7,039,727 B2 | 5/2006 | Camara et al. | 710/5 |
| 7,047,343 B2 | 5/2006 | Shaw | |
| 7,051,218 B1 * | 5/2006 | Gulick et al. | 713/310 |
| 7,149,888 B1 | 12/2006 | Hart et al. | 713/2 |
| 7,210,619 B2 | 5/2007 | Wurzburg | 235/375 |
| 7,302,512 B1 * | 11/2007 | Currid et al. | 710/268 |
| 7,660,938 B1 * | 2/2010 | Chow et al. | 710/313 |
| 7,802,034 B2 * | 9/2010 | Liu et al. | 710/62 |
| 8,332,676 B2 * | 12/2012 | Lyra et al. | 713/323 |
| 2002/0056142 A1 * | 5/2002 | Redmond | 725/151 |
| 2002/0155893 A1 | 10/2002 | Swanberg et al. | |
| 2003/0058284 A1 | 3/2003 | Toh et al. | |
| 2003/0115013 A1 * | 6/2003 | Dendinger | 702/132 |
| 2003/0167345 A1 | 9/2003 | Knight et al. | |
| 2004/0027879 A1 | 2/2004 | Chang | |
| 2004/0078514 A1 | 4/2004 | Kung et al. | 711/105 |
| 2004/0130505 A1 | 7/2004 | Lee et al. | 345/30 |
| 2004/0143768 A1 | 7/2004 | Calhoon | |
| 2004/0163003 A1 | 8/2004 | Dutton | 713/320 |
| 2004/0221181 A1 | 11/2004 | Yu | |
| 2005/0055592 A1 * | 3/2005 | Velasco et al. | 713/322 |
| 2005/0114716 A1 * | 5/2005 | O | 713/300 |
| 2005/0156041 A1 | 7/2005 | Wurzburg | |
| 2007/0023499 A1 | 2/2007 | Wurzburg et al. | 235/376 |
| 2007/0139705 A1 | 6/2007 | Ogiwara et al. | 358/1.15 |
| 2008/0046608 A1 * | 2/2008 | Lee et al. | 710/30 |
| 2008/0147907 A1 * | 6/2008 | Triece et al. | 710/22 |
| 2008/0162753 A1 * | 7/2008 | Liu et al. | 710/74 |
| 2013/0013825 A1 * | 1/2013 | Muto | 710/56 |

FOREIGN PATENT DOCUMENTS

| | | | |
|---|---|---|---|
| JP | 08050643 A | * | 2/1996 |
| JP | 408050643 A | | 2/1996 |
| JP | 2000035837 | | 2/2000 |
| JP | 2003140784 | | 5/2003 |
| JP | 2003280775 | | 10/2003 |

OTHER PUBLICATIONS

'PCI Bus Power Management Interface Specification' Revision 1.1 PCI Special Interest Group Dec. 18, 1998 pp. 55-59.*

'Power Saving of Using USB Selective Suspend Support Whitepaper' Version 0.6 Kris Fleming May 20, 2003 pp. 1-7.*

Universal Serial Bus Specification Revision 2.0, Apr. 27, 2000.*

'Distributed Topology Construction of Bluetooth Personal Area Networks' by Salonidis et al., copyright 2001, IEEE.*

'Universal Serial Bus Specification' Revision 2.0, Compaq et al., Apr. 27, 2000, pp. i, ii, and 23.*

"Universal Serial Bus—Understanding WDM Power Management" Version 1.1, Aug. 7, 2000 by Kosta Koeman, Intel Corporation.*

U.S. Appl. No. 10/762,767, filed Jan. 20, 2004, Wurzburg et al.

"The Laptop Computer May Be Unable to Enter the C3 Processor Power-Saving State"; printed from the Internet: http://support.microsoft.com/default.aspx?scid=kbjen-us;297045; (Article publication date is unknown).

"Advanced Configuration and Power Interface Specification," Revision 2.0c, Aug. 25, 2003; pp. 1-200.

"Advanced Configuration and Power Interface Specification," Revision 2.0c, Aug. 25, 2003; pp. 201-518.

Prior Art Statement (2 pages).

* cited by examiner

POWER MANAGED USB FOR COMPUTING APPLICATIONS USING A CONTROLLER

PRIORITY

This application is a continuation-in-part of U.S. patent application Ser. No. 10/762,684 titled "Systems and Methods for Power Reduction in Systems Having Removable Media Devices" filed on Jan. 20, 2004, now U.S. Pat. No. 7,086,583 whose inventor is Henry Wurzburg, and which is hereby incorporated by reference as though fully and completely set forth herein.

BACKGROUND OF THE INVENTION

1. Field of the Invention

The present invention relates generally to computers and, more specifically, to power management.

2. Description of the Related Art

A Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. USB based systems may require that a host controller be present in the host system, and that the operating system (OS) of the host system support USB devices.

In general, a USB device attached to the host controller of the computer may prevent the central processing unit (CPU) of the computer from entering a low power state—e.g., the C3 state. The host controller, as a bus mastering peripheral, may keep the Peripheral Component Interconnect (PCI) bus active as long as the host controller is attached to a USB device. The active PCI bus may prevent the CPU from going into a low power state.

Portable computers may not be able to provide full, aggressive power and system management of USB devices and peripherals through a USB only interface. The USB interface may not provide sufficient information between the USB device and a power management entity of the portable computer to implement aggressive power management.

SUMMARY OF THE INVENTION

In various embodiments, a computer system (e.g., a portable computer system) may be coupled to one or more USB devices. In some embodiments, the computer system may be coupled to an embedded USB device (e.g., an embedded USB keyboard). The computer system may communicate with the USB device through a host controller for USB functions. In addition, the computer system may be coupled to a computer controller to send and/or receive sideband signals to/from the USB device. In some embodiments, the computer controller may be an embedded controller. In some embodiments, the USB device may include a USB controller to send/receive sideband signals to/from the computer controller. In some embodiments, the USB controller may be a microcontroller.

In some embodiments, the computer controller and USB controller may allow communications between the computer system and the USB device when either of the computer system or USB device is in a low power state. The sideband signal sent between the computer system and the USB device may trigger the other of the computer system or USB device to enter a normal power state. Because the computer system and USB device can communicate through sideband signals while one of the computer system and USB device is in a low power state, the computer system and/or USB device may be allowed to enter a low power state. Without sideband signals, the computer system and/or USB device may not be able to awaken from a low power state and therefore, may have to be maintained at a normal power state.

In some embodiments, the computer controller and/or USB controller may be further coupled to a memory to buffer data to be sent to the computer system or USB device after the computer system or USB device returns to a normal power state. For example, keystrokes typed by a user may be stored in a memory coupled to the USB controller of an embedded USB keyboard and then the keystrokes may be sent to the computer system after the computer system returns to a normal power state (e.g., after receiving a sideband signal from the USB device's microcontoller).

BRIEF DESCRIPTION OF THE DRAWINGS

A better understanding of the present invention may be obtained when the following detailed description is considered in conjunction with the following drawings, in which.

Figure 1:
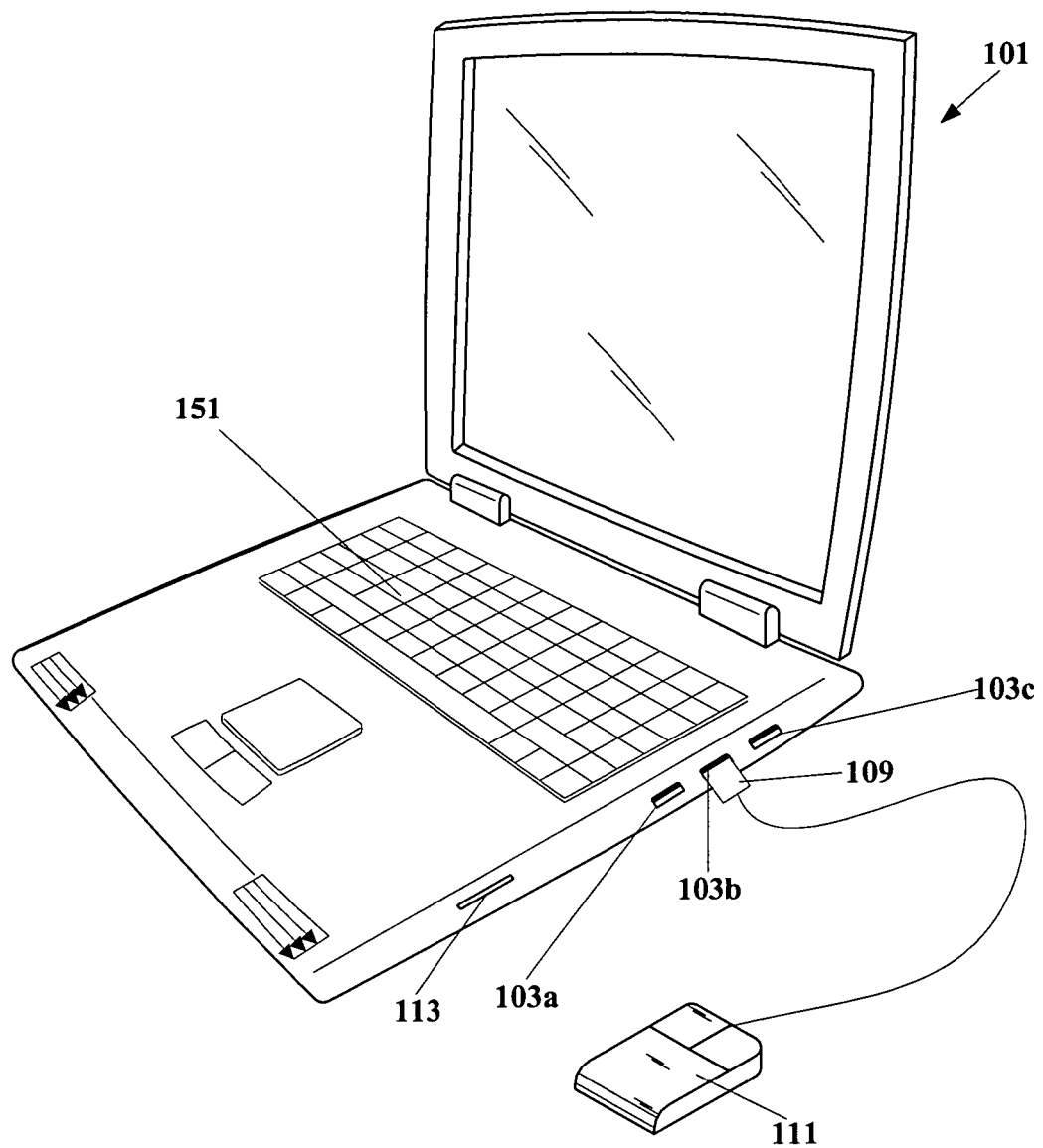
FIG. 1 illustrates an embodiment of a portable computer for various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

FIG. 1 illustrates an embodiment of portable computer 101 for various embodiments. Various embodiments may be used with various different types of systems of computers, and portable computer 101 is one exemplary embodiment.

In some embodiments, portable computer 101 may be used with multiple peripheral devices such as, but not limited to, Universal Serial Bus (USB) devices (e.g., computer mouse 111, scanners, printers, external memory devices, cameras, personal digital assistants (PDAs), keyboards, touchscreens, and joysticks). In some embodiments, USB devices may be embedded in the portable computer 101 (e.g., embedded USB keyboard 151). Other devices coupled to the computer system are also contemplated.

In some embodiments, USB devices may be coupled to portable computer 101 through one or more USB ports 103. USB ports 103 may be on portable computer 101 or on a docking station (not shown) coupled to portable computer 101. USB connector 109 may plug into USB port 103 to couple a USB device to portable computer 101.

In some embodiments, the USB devices may be configured to send and/or receive data from the computer system. For example, a USB device may send data such as keystrokes, joystick movements, etc. to the computer system. The USB device may also receive data (e.g., a USB printer may receive data corresponding to a print job). In some embodiments, the USB device may be a trusted device (e.g., a keyboard with a trusted mobile keyboard controller). In some embodiments, data sent between the computer system and the USB device may be encrypted.

Figure 2:
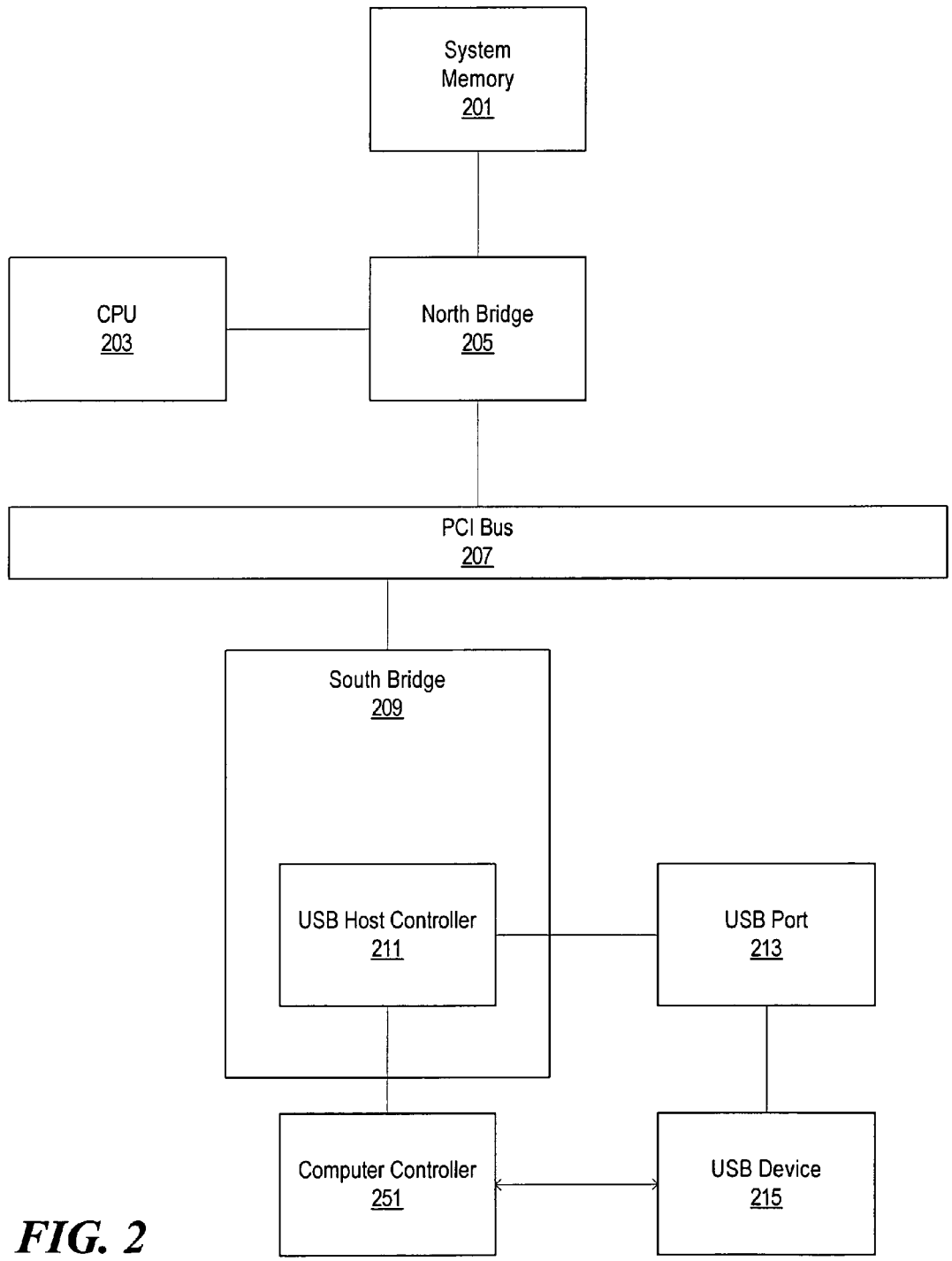
FIG. 2 is a block diagram of one embodiment of a computer.

FIG. 2 is a block diagram of one embodiment of portable computer 101. In some embodiments, north bridge 205 (an integrated chip) couples central processing unit (CPU) 203 and system memory 201 to peripheral component interconnect (PCI) bus 207 (used to connect peripherals to the computer). As shown, south bridge 209 couples to the PCI bus 207. In some embodiments, south bridge 209 may include host controller 211 to communicate through USB port 213 with USB device 215. USB port 213 and USB device 215 may be internal or external to the computer. In some embodiments, host controller 211 may provide a peripheral bus interface between USB device 215 and the computer system. In some embodiments, host controller 211 may be part of a different device configured to communicate with USB devices. In some embodiments, an embedded USB hub may also be coupled to host controller 211 through an internal connection. The embedded USB hub may provide multiple USB ports 213 on portable computer 101. In some embodiments, computer controller 251 may communicate sideband signals to/from USB device 215. It is to be understood that the term "sideband signal" as used herein is a separate signal from typical USB signals sent between a host controller and a USB device. For example, the sideband signal may be a signal not contemplated by a USB specification. In some embodiments, sideband signals may not be sent over a medium (i.e., a first medium) used to communicate USB signals between the host controller and the USB device, but instead may be sent over a separate medium (i.e., a second medium) (e.g., a separate wire or radio frequency). In some embodiments, the sideband signal may be sent over a wire bundled together with wires for the USB signals. In some embodiments, the sideband signal may be sent over a wire not bundled with the wires for USB signals. In some embodiments, the sideband signals may be encrypted.

As seen in FIGS. 1 and 2, USB devices 215, such as embedded USB keyboard 151, may communicate with a computer system (e.g., portable computer 101) through host controller 211 in a PC chipset. Host controller 211 may regulate communication with attached USB devices 215 (e.g., scheduling bandwidth on the bus). In some embodiments, host controller 211 may detect USB devices 215. For example, host controller 211 may detect embedded USB devices 215 when the computer system initially powers up. In some embodiments, host controller 211 may detect USB devices 215 as they are connected to USB port 213. As host controller 211 detects USB devices 215, host controller 211 may interrogate USB devices 215 (e.g., to find out what speed to use for communication with USB device 215 and the USB device's capabilities) and then load a driver (e.g., an operating system (OS) device driver) to support USB device 215. Communication speeds with USB devices 215 coupled to host controller 211 may include low speed (LS), full speed (FS), and high speed (HS). USB devices 215 may communicate with host controller 211 using control, interrupt, bulk, and isochronous transfers. In addition, USB device 215 may be powered over the USB bus, while some USB devices 215 may be self powered. When USB device 215 is disconnected from USB port 213, host controller 211 may detect the absence of USB device 215 and unload the driver.

Figure 3:
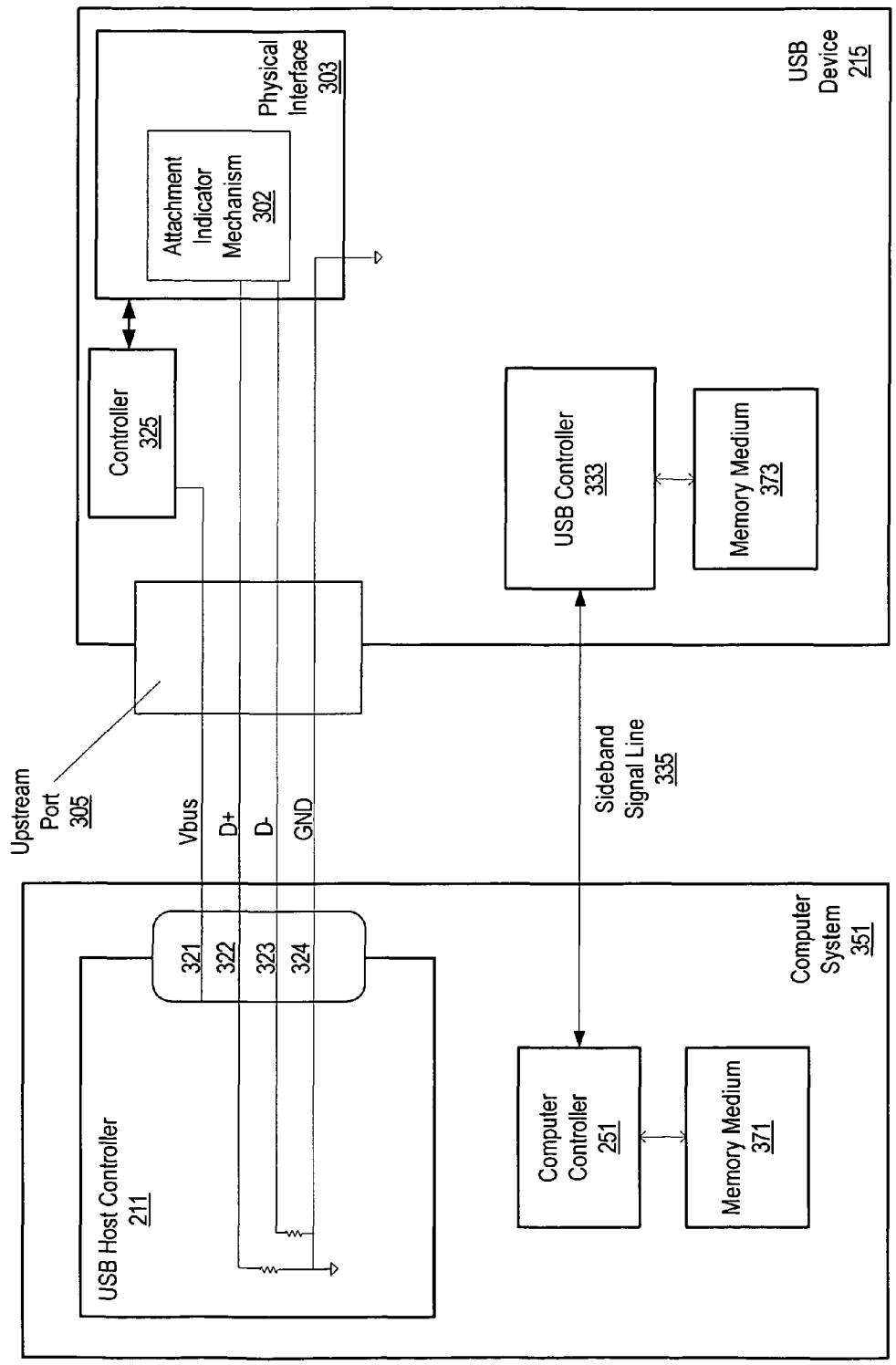
FIG. 3 is a block diagram of a computer system coupled to a USB device, according to an embodiment.

FIG. 3 is a block diagram of an embodiment of computer system 351 coupled to USB device 215. In various embodiments, computer system 351 may include computer controller 251 for sending and/or receiving sideband signals to/from USB device 215. In some embodiments, computer controller 251 may be an embedded controller. In some embodiments, the computer controller 251 may be a microcontroller. In some embodiments, USB device 215 may include USB controller 333 for sending/receiving the sideband signals. In some embodiments, USB controller 333 may be a microcontroller. In various embodiments, computer controller 251 in computer system 351 may be coupled to USB device 215 through sideband signal line 335 (i.e., a second medium). In some embodiments, computer controller 251 functionality may be incorporated into host controller 211. In some embodiments, USB controller 333 on USB device 215 may be coupled to sideband signal line 335 to send/receive sideband signals from computer controller 251 (and/or host controller 211).

In various embodiments, sideband signals may be sent between computer system 351 and USB device 215 to communicate information and/or signals between computer system 351 and USB device 215 when each is in varying power states. For example, sideband signals may be sent between computer system 351 and USB device 215 to trigger computer system 351 or USB device 215 to return to a normal power state (from a low power state). For example, computer system 351 may send a sideband signal to USB device 215 to trigger USB device 215 to return to a normal power state. In some embodiments, USB device 215 may send a sideband signal to computer system 351 to trigger computer system 351 to enter a normal power state.

In various embodiments, computer controller 251 may be coupled to memory medium 371 to buffer data to be sent to or received from USB device 215. In some embodiments, USB device 215 may include memory medium 373 to buffer data to be sent to or received from computer system 351. The memory medium on computer system 351 and/or USB device 215 may be used to buffer data when computer system 351 or USB device 215 is in a low power state (and, therefore, may not be able to receive the data). For example, keystrokes on an embedded USB keyboard may be buffered if computer system 351 is in a low power state. The keystrokes may be buffered on memory medium 373 on the embedded USB keyboard or may be sent to memory medium 371 on computer system 351 to be buffered until computer system 351 returns to a normal power state. In some embodiments, if computer system 351 is not in a normal power state, data may not be buffered on memory medium 371 on computer system 351. In some embodiments, data may be buffered on computer system memory medium 371 when USB device 215 is in a low power state. For example, instructions to a USB printer may be buffered until the USB printer returns to a normal power state (e.g., after receiving a sideband signal from the computer system to return to the normal power state). In some embodiments, the instructions may be buffered on computer system 351 and sent after the USB printer returns to the normal power state or the instructions/data may be sent to the USB printer and buffered until the USB printer returns to a normal power state. In some embodiments, USB device 215 may not buffer data if USB device 215 is in a low power state.

In some embodiments, USB device 215 (e.g., a USB printer) may receive a sideband signal indicating the power state of computer system 351. If USB device 215 has a warm-up period, USB device 215 may be able to indicate a warm up when computer system 351 wakes up. The warm up may begin even before the host controller initializes the USB interface. USB device 215 may not require a warm-up period when a request is received. Other USB devices may also have latency periods that may be reduced with a sideband signal indicating the computer system is waking up.

In some embodiments, embedded USB device 215 (e.g., embedded USB keyboard 151) may be electrically connected to portable computer 101 when portable computer 101 is first powered up. USB keyboard 151 may communicate with host controller 211 of portable computer 101 through power line 321, ground 324, and a pair of data lines 322, 323 (D+ and D−) to transfer data and power between portable computer 101 and embedded USB keyboard 151. In some embodiments, the D+ and D− lines (322, 323) may interact with physical interface 303 through attachment indicator mechanism 302.

In some embodiments, an algorithm (e.g., stored in firmware on a memory coupled to USB device 215) may be implemented to electrically disconnect the USB device (e.g., USB keyboard 151) from host controller 211. Firmware may be on a read only memory (ROM) or a programmable read only memory (PROM) accessible by USB device 215 (e.g., internal or external memory). For example, firmware may be on an Electrically Erasable Programmable Read-Only Memory (EEPROM) that may be externally attached/detached to USB device 215 to activate/deactivate the electrical disconnect feature.

In some embodiments, for full speed USB devices, when the USB device is electrically attached to host controller 211, the USB device may electrically connect to the computer system by pulling D+ line 322 high to approximately 3.3 volts using a pull up resistor (not shown) on D+ line 322. Host controller 211 may then detect the presence of the USB device on the bus and reset the USB device. High speed USB devices may connect the same way as full speed devices except, during reset, the high speed device "chirps" by driving D− line 323 high. Host controller 211 responds by alternately driving the D+ and D− lines high. When the high speed USB device detects the alternating chirps, the high speed USB device electrically removes the pull up resistor to balance the line and continues communicating at high speed.

In some embodiments, to electrically disconnect, full speed USB devices may electrically remove the pull up resistor (i.e., set to high impedance or "tri-stated") from the D+ line. Host controller 211 may interpret this as a disconnect. To electronically disconnect high speed USB devices the D+ and D− lines may both be tri-stated (set to high impedance).

Referring to FIGS. 2 and 3, in some embodiments, when USB device 215 (e.g., an embedded USB keyboard) is electrically disconnected from host controller 211 and no system activity from a bus mastering peripheral is occurring on PCI bus 207, CPU 203 may enter a lower power state. For example, if USB device 215 has not been used for a first specified amount of time (e.g., 10 seconds), USB device 215 may be powered down. When USB device 215 powers down, it may not cause system activity on PCI bus 207 and CPU 203 may be allowed to enter a low power state. In some embodiments, a sideband signal may then be sent between the computer system and USB device 215 to signal the computer system or USB device 215 to return to a normal power state.

For example, if computer system 351 receives a signal from the user to return to a normal power state, computer system 351 may send a sideband signal to USB device 215 to return to a normal power state and/or electrically connect to computer system 351. In some embodiments, if USB device 215 is used while computer system 351 is in a low power state, USB device 215 may send a sideband signal to computer system 351 to signal computer system 351 to return to a normal power state and connect USB device 215.

In various embodiments, because the sideband signals are available for embedded USB devices 215, the driver model for computer system 351 (especially portable computer systems) may be unified for all human interface device (HID) (e.g., switches, buttons, keyboard, mouse, pointer, etc.). In some embodiments, the portable computer may use a low pin count (LPC) interface for embedded devices and a PS/2 or USB interface for external HID devices. If using the sideband signals, the PS/2 or USB interface may be used for all devices (including devices previously handled with the LPC bus).

Figure 4:
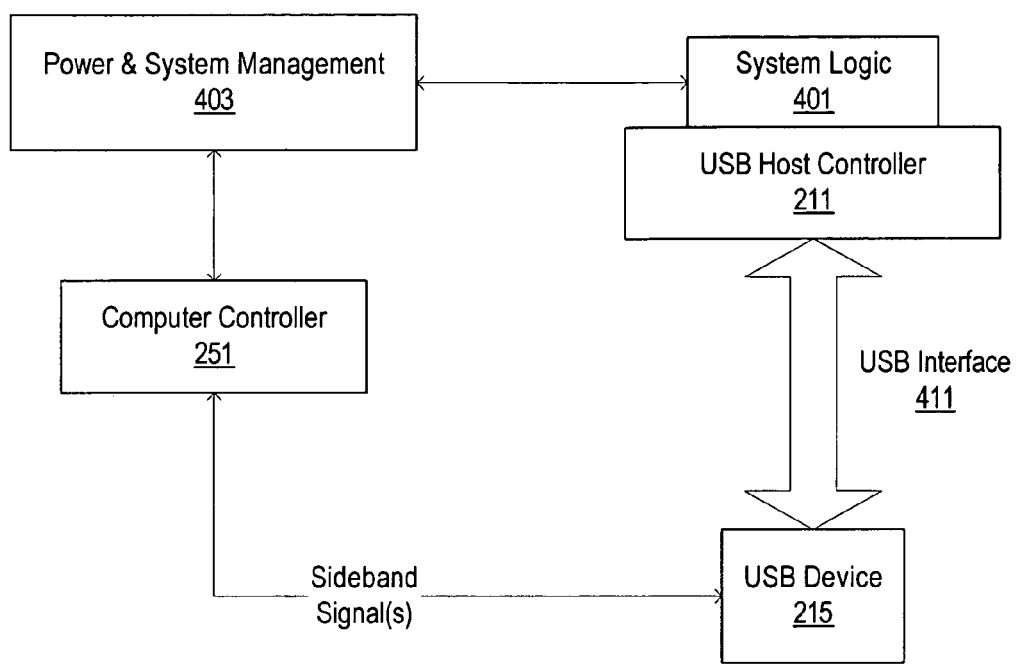
FIG. 4 is a power and system management interface, according to an embodiment.

FIG. 4 is an embodiment of a power and system management interface. In some embodiments, power and system management 403 may interface with system logic 401 coupled to USB host controller 211. Power and system management 403 may be further coupled to computer controller 251. Computer controller 251 may be coupled to USB device 301 through a sideband signal line to pass sideband signals. In some embodiments, USB device 301 may be coupled to USB host controller 211 through USB interface 411. In some embodiments, power and system management 403 may manage power states of the computer system and/or USB devices coupled to the computer system.

Figure 5:
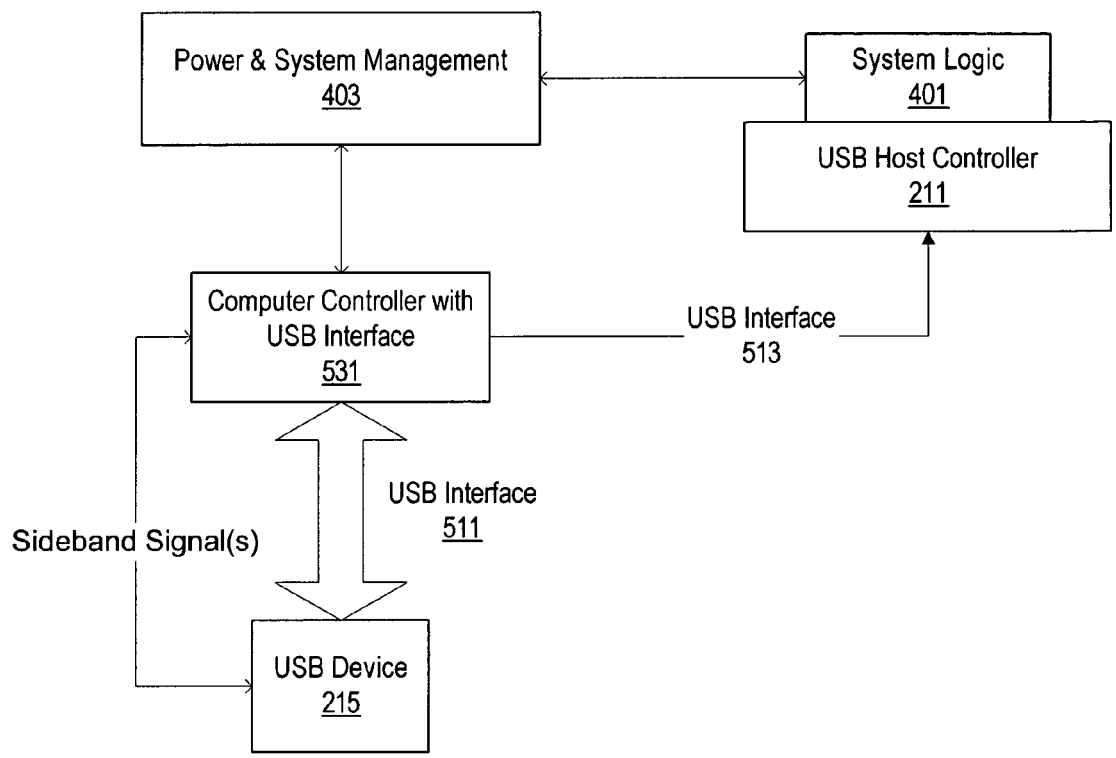
FIG. 5 is a power and system management interface, according to another embodiment.

FIG. 5 is another embodiment of a power and system management interface. In some embodiments, power and system management 403 may interface with system logic 401 coupled to USB host controller 211. Power and system management 403 may be further coupled to computer controller 531. Computer controller 531 may be coupled to USB device 301 through a sideband signal line to pass sideband signals through USB interface 511. In some embodiments, computer controller 531 may be coupled to USB host controller 211 through separate USB interface 513.

Figure 6:
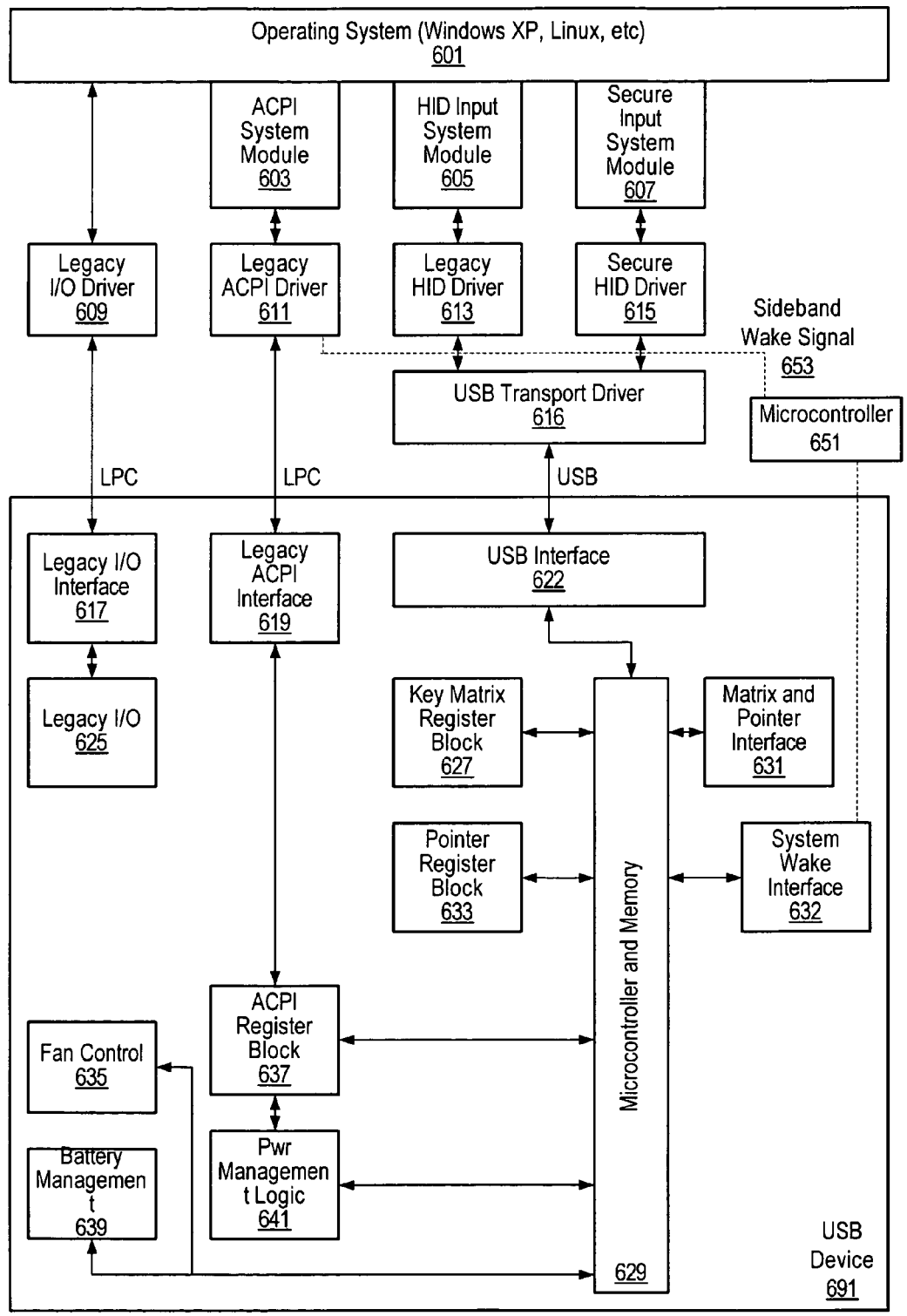
FIG. 6 illustrates a USB/LPC interface between a USB device and a computer system, according to an embodiment.

FIG. 6 illustrates an embodiment of a USB/LPC interface between a USB device and a computer system. In some embodiments, USB device 691 may include USB controller/memory 629 to interface with various components including battery management 639, fan control 635, power management logic 641, Advanced Configuration and Power Interface (ACPI) register block 637, pointer register block 633, key matrix register block 627 and matrix and pointer interface 631. In some embodiments, key matrix register block 627 may interface with microcontroller 629. ACPI register block 637 may interface with legacy ACPI interface 619. Legacy Input/Output (I/O) 625 may communicate with legacy I/O interface 617. Various components of the USB device 691 may interface with other components of the system. For example, legacy I/O interface 617 may interface with legacy I/O driver 609. Legacy ACPI interface 619 may interface with legacy ACPI driver 611. In some embodiments, the device components may communicate with the computer components through a LPC bus. Some of the components may communicate through a secure LPC. In some embodiments, legacy I/O driver 609 may communicate with operating system (OS) 601. Legacy ACPI driver 611 may communicate with the ACPI system module 603 which may communicate with OS 601. Legacy ACPI driver 611 may manipulate the power management features. Legacy human interface device (HID) driver 613 may communicate with (HID) input system module 605 that may communicate with OS 601. Secure HID driver 615 may communicate with secure input system module 607 that may communicate with OS 601. In some embodiments, USB device 691 may communicate with the system through the LPC bus. In some embodiments, an interface and sideband signals may be sent between computer system 351 and USB device 691.

In some embodiments, legacy HID driver 613 and secure HID driver 615 may communicate with USB transport driver 616. USB transport driver 616 may communicate with USB interface 622 of USB device 691. USB interface 622 may communicate with microcontroller/memory 629 which may also be coupled to system wake interface 632. In some embodiments, communications between the system and USB device 691 may include an interface and sideband signals (e.g., through system wake interface 632). In some embodiments, the use of USB for a secure keyboard controller (KBC) interface may reduce the number of secure channels for which logical functionality must be created and for which secure device drivers must be written. In some embodiments, microcontroller 651 (e.g., on south bridge 209) may receive sideband wake signal 653 from system wake interface 632 to driver 611.

Figure 7:
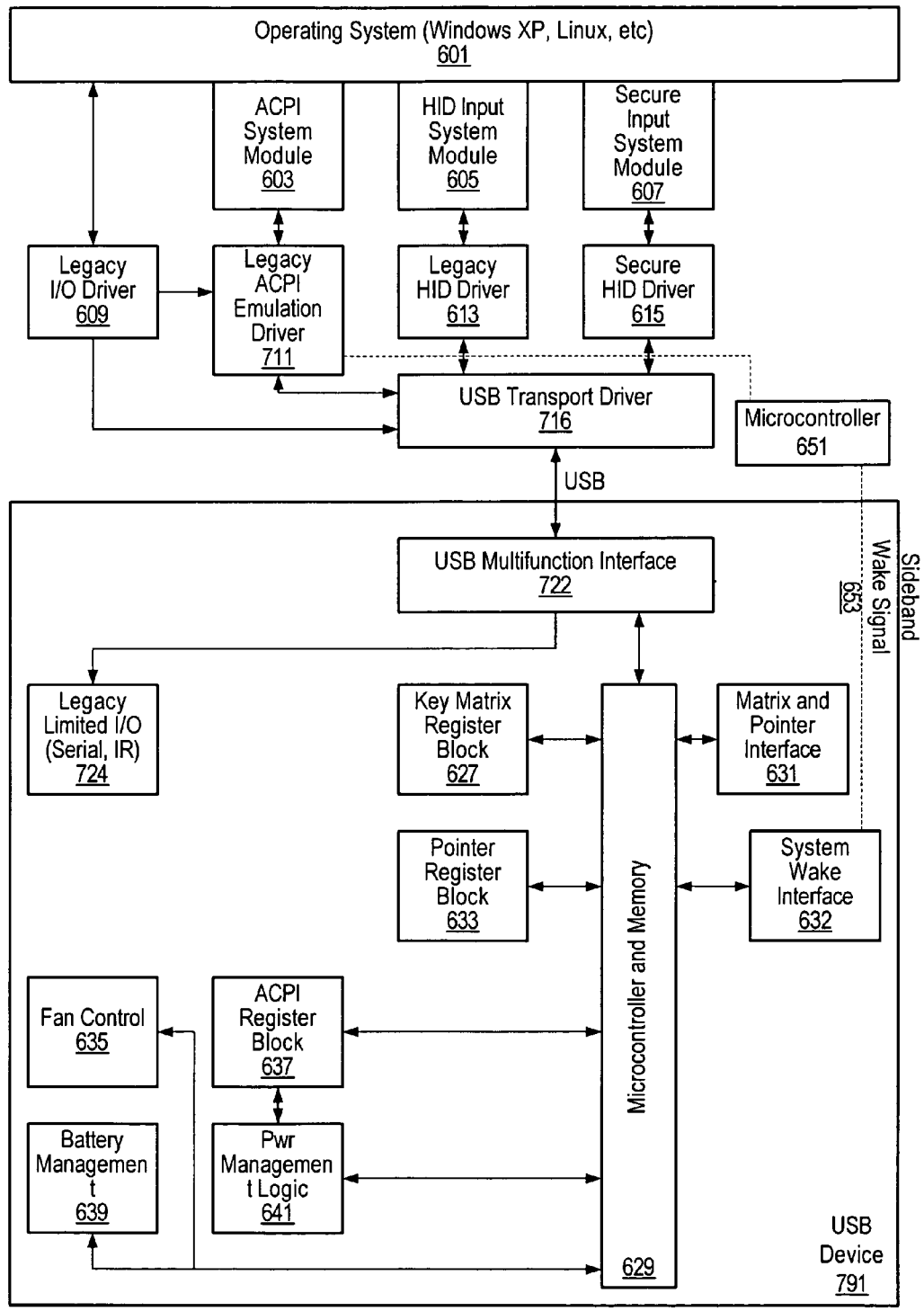
FIG. 7 illustrates a USB interface between a computer and a USB device, according to an embodiment.

FIG. 7 illustrates an embodiment of a USB interface between a computer and a device. Legacy ACPI emulation driver 711 may communicate with legacy I/O driver 609 and USB transport driver 716. Legacy I/O driver 609 may communicate with legacy ACPI emulation driver 711 and USB transport driver 716. In some embodiments, USB transport driver 716 may communicate with USB multifunction interface 722 which may communicate with legacy limited I/O (Serial, IR) 724. USB multifunction interface 722 may communicate with microcontroller/memory 629. In some embodiments, an interface and sideband signals may be handled via legacy ACPI emulation driver 711. In some embodiments, the configuration of FIG. 7 may be used to establish a USB interface with USB device 791 without a separate LPC interface.

Figure 8:
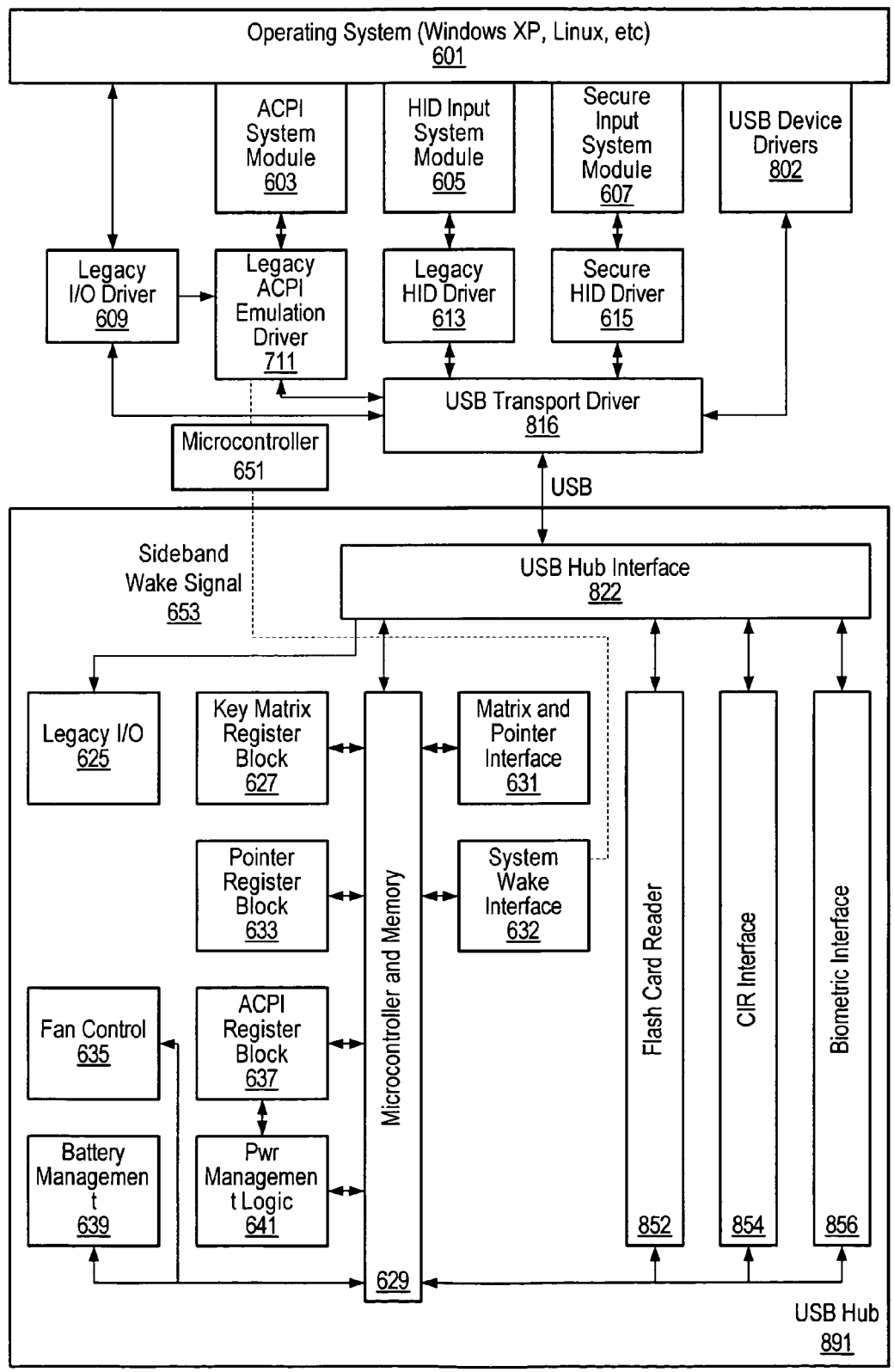
FIG. 8 illustrates a USB interface between a computer and a USB hub, according to an embodiment.

FIG. 8 illustrates an embodiment of a USB interface between a computer and USB hub 891. OS 601 may communicate with USB device driver 802 which may also communicate with USB transport driver 816. USB transport driver 816 may communicate with USB hub interface 822. In some embodiments, USB hub interface 822 may communicate with legacy I/O 625, microcontroller/memory 629, flash card reader 852, CIR interface 854 and biometric interface 856. Flash card reader 852, CIR interface 854, and biometric interface 856 may also communicate with microcontroller/memory 629.

Figure 9:
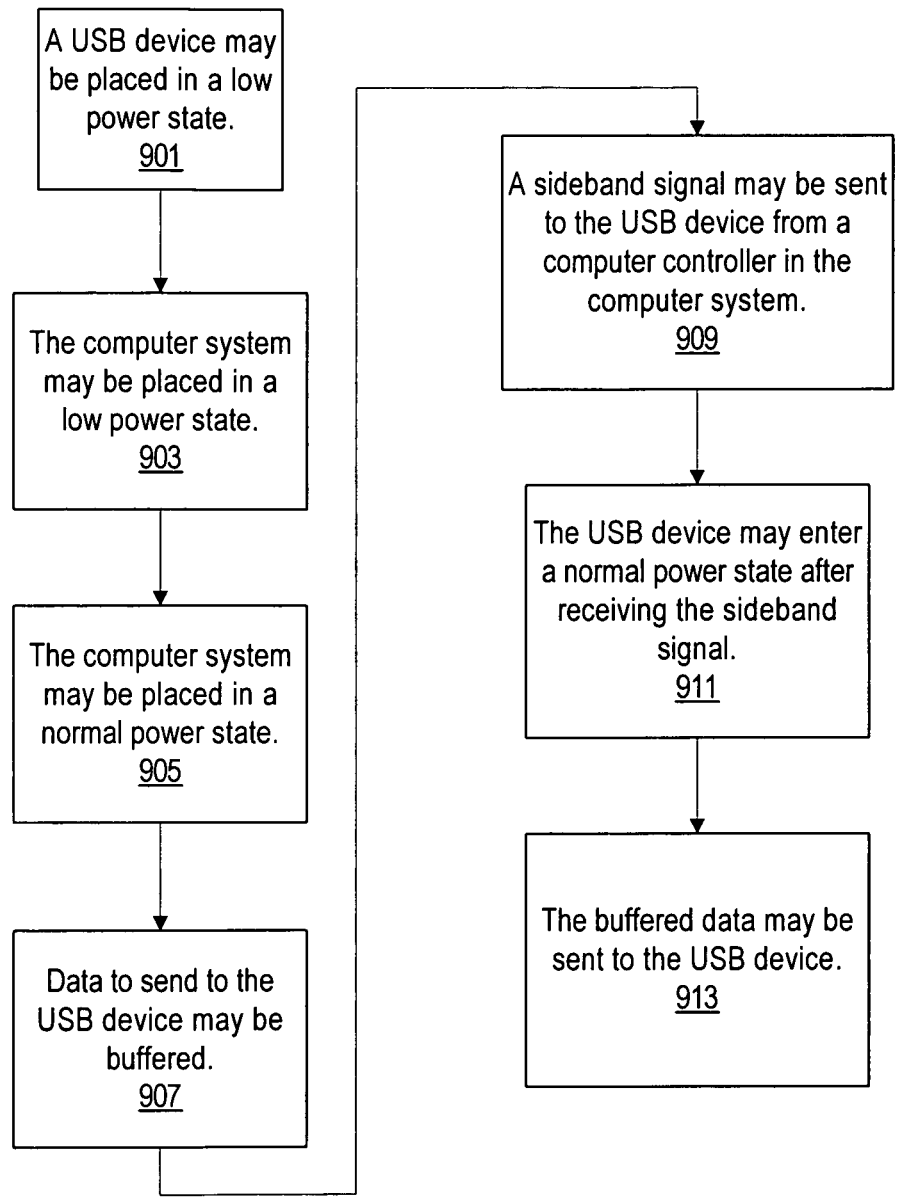
FIG. 9 is a flowchart for using a sideband signal to power manage a USB device, according to an embodiment.

FIG. 9 is a flowchart for using a sideband signal to power manage a USB device, according to an embodiment. It should be noted that in various embodiments of the methods described below, one or more of the elements described may be performed concurrently, in a different order than shown, or may be omitted entirely. Other additional elements may also be performed as desired.

At 901, a USB device may be placed in a low power state. For example, if the USB device has not been used for a pre-specified amount of time, the USB device may be configured to enter a low power state. In some embodiments, the computer system may send the USB device a sideband signal to signal the USB device to enter a low power state (e.g., if the computer system is about to enter a low power state, the computer system may signal USB devices coupled to the computer system to enter a low power state).

At 903, the computer system may be placed in a low power state. The computer system may enter a low power state if there is no system activity occurring on the PCI bus from a bus mastering peripheral.

At 905, the computer system may be placed in a normal power state. For example, the computer system may be placed into a normal power state upon receiving an indication from a user. For example, a user may use a device coupled to the computer system. In some embodiments, the computer may receive a different signal to return to a normal power state (e.g., a signal may be received over a network). In some embodiments, the computer system may automatically return to a normal power state after a specific time interval.

At 907, data to send to the USB device may be buffered. For example, a memory on the computer system may be used to buffer data to send to the USB device. In some embodiments, the memory may be coupled to the USB device. The buffer may be used for data that may otherwise not be receivable by the USB device until the USB device enters a normal power state.

At 909, a sideband signal may be sent to the USB device from a computer controller in the computer system. In some embodiments, the sideband signal may be sent to the USB device when the computer system enters a normal power state. The sideband signal may be sent over the sideband signal line from the computer system to a USB controller on the USB device.

At 911, the USB device may enter a normal power state after receiving the sideband signal. In some embodiments, the USB device may include a USB controller for receiving the sideband signal from the computer system.

At 913, the buffered data may be sent to the USB device.

Figure 10:
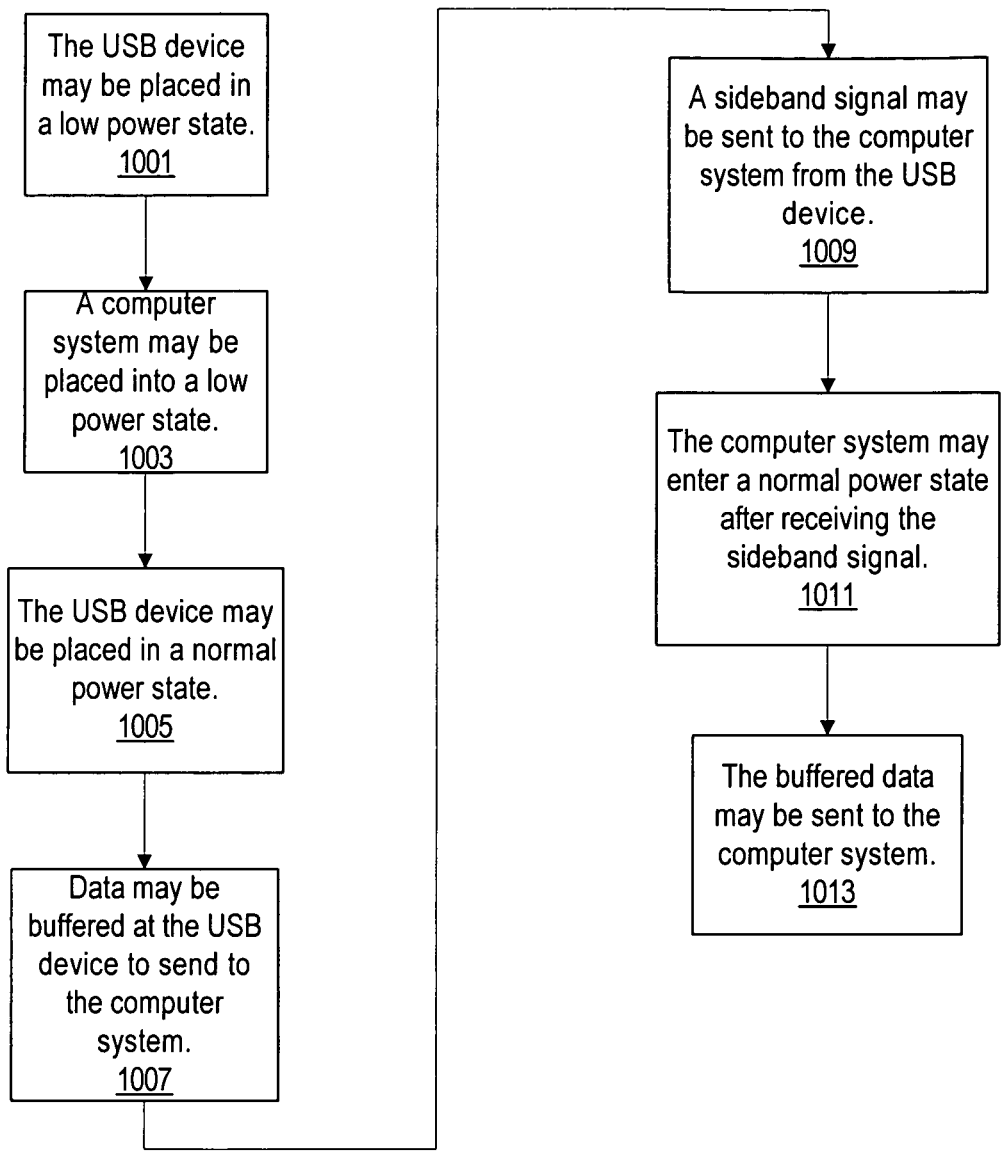
FIG. 10 illustrates a flowchart of power managing a computer system coupled to a USB device, according to an embodiment.

FIG. 10 illustrates a flowchart of power managing a computer system coupled to a USB device, according to an embodiment. It should be noted that in various embodiments of the methods described below, one or more of the elements described may be performed concurrently, in a different order than shown, or may be omitted entirely. Other additional elements may also be performed as desired.

At 1001, the USB device may be placed in a low power state. For example, if the USB device has not been used in a specified amount of time, the USB device may enter a low power state. The USB device may or may not electrically disconnect the USB interface from the computer system when the USB device enters a low power state.

At 1003, a computer system may be placed into a low power state.

At 1005, the USB device may be placed in a normal power state. In some embodiments, the USB device may enter a normal power state upon receiving an indication from the user (e.g., the user may use the USB device). If the USB device is an embedded USB keyboard, the user's keystrokes on the keyboard may signal the keyboard to return to a normal power state.

At 1007, data may be buffered at the USB device to send to the computer system. In some embodiments, data that may otherwise not be receivable until the computer system enters a normal power state may be stored in a memory coupled to the USB device. For example, keystrokes typed by a user may be stored in a memory coupled to the USB controller of an embedded USB keyboard and then the keystrokes may be sent to the computer system after the computer systems returns to a normal power state (after receiving a sideband signal from the USB device). In some embodiments, the data may be stored on a memory coupled to the computer system.

At 1009, a sideband signal may be sent to the computer system from the USB device. In some embodiments, the sideband signal may be sent to the computer system when the USB device enters the normal power state.

At 1011, the computer system may enter a normal power state after receiving the sideband signal. In some embodiments, the computer system may include a computer controller to receive sideband signals from the USB device.

At 1013, the buffered data may be sent to the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus, comprising:
   a computer system, comprising:
   a central processing unit (CPU);
   a computer controller coupled with the central processing unit, wherein the computer controller comprises a USB host controller and a separate controller for handling said sideband signal;
   wherein the computer controller is configured to communicate with a Universal Serial Bus (USB) device coupled to the computer system via a first medium and a second medium, wherein the USB device is external to the computer system, wherein the computer system and USB device are coupled to perform USB communications using the first medium and to perform sideband communications using the second medium, wherein the first medium and the second medium are different;
   wherein the computer system is configured to communicate the sideband signal to the USB device over a sideband signal line when the sideband signal line is coupled to the computer system; and
   wherein the computer system and USB device are operable to use the sideband signal line to trigger the other of the computer system or USB device to return to a normal power state from a low power state and wherein during the low power state the separate controller buffers data received from the USB device until the computer system returned to the normal power state.

2. The apparatus of claim 1, wherein the computer system is configured to buffer data to send to the USB device.

3. A method, comprising:
   placing a Universal Serial Bus (USB) device in a low power state;
   sending a sideband signal to the USB device from a computer controller coupled to a computer system comprising a central processing unit to trigger the USB device to enter a normal power state, wherein the USB device is external to the computer system, wherein said sending is performed over a first medium; and
   wherein the USB device enters the normal power state after receiving the sideband signal, wherein data to be sent to the USB device after sending the sideband signal but before the USB device entered the normal power state is buffered;
   after the USB device enters the normal power state, performing USB communications between the USB device and said central processing unit over a second medium that is different than the first medium, wherein the computer system sending the buffered data to the USB device when the USB device is in the normal power state.

4. The method of claim 3,
   wherein the USB device is coupled to a USB controller;
   wherein the USB controller is part of the computer controller.

5. The method of claim 3, wherein the computer system sends the sideband signal via said computer controller to the USB device when an indication is received from a user.

6. The method of claim 3, further comprising:
   placing the computer system in a low power state;
   placing the computer system in a normal power state; and
   wherein the computer system enters the normal power state after receiving an indication from a user.

7. The method of claim 6, wherein the computer controller sends the sideband signal to the USB device when the computer system enters the normal power state.

8. The method of claim 6, wherein the indication from the user includes using a device coupled to the computer system.

9. A method, comprising:
   providing a computer system having a central processing unit and a controller coupled with the central processing system;
   sending a sideband signal to the controller from a Universal Serial Bus (USB) device to trigger the computer system to enter a normal power state from a low power state, wherein the USB device is external to the computer system, and wherein said sending the sideband signal is performed over a first medium;
   wherein the computer system enters the normal power state after receiving the sideband signal;
   after the computer system enters the normal power state, performing USB communication with the computer system over a second medium that is different than the first medium;
   the USB device buffering data to send to the computer system while the computer system is in the low power state; and
   the USB device sending the buffered data to the computer system when the computer system enters the normal power state.

10. The method of claim 9,
    wherein the controller comprises a USB controller and a separate computer controller;
    wherein the computer controller is configured to receive the sideband signal from the USB device.

11. The method of claim 9, wherein the USB device sends the sideband signal to the controller when an indication is received from a user.

12. The method of claim 9, further comprising:
    placing the USB device in a low power state;
    placing the USB device in a normal power state; and wherein the USB device enters the normal power state after receiving an indication from a user.

13. The method of claim 12, wherein the USB device sends the sideband signal to the controller when the USB device enters the normal power state.

14. The method of claim 12, wherein the indication from the user includes using the USB device.

15. An apparatus, comprising:
a computer system, comprising:
  a processor;
  a computer controller coupled to the processor; and
  a memory medium coupled to the processor;
  a Universal Serial Bus (USB) communication medium coupled to the computer system, wherein the USB communication medium is operable to transmit USB signals from the computer system to a USB device, wherein the USB device is external to the computer system;
  a sideband signal line coupled to the computer controller, wherein the sideband signal line is a separate communication medium than the USB communication medium and wherein the sideband signal line is operable to communicate a sideband signal to the USB device from the computer controller; and
  wherein the memory medium is operable to buffer data to send from the computer system to the USB device when the USB device is in a low power state; and
  wherein the computer system is operable to send the buffered data to the USB device after the USB device enters a normal power state;
  wherein the computer system is operable to trigger the USB device to enter the normal power state from the low power state by sending the USB device a sideband signal over the sideband signal line.

16. The apparatus of claim 15, wherein the computer controller is operable to send the sideband signal over the sideband signal line and wherein the computer controller is a separate controller than a USB host controller on the computer system coupled to the USB communication medium.

17. The apparatus of claim 1,
wherein the USB device is operable to electrically disconnect from the computer system over a USB communication medium prior to the computer system entering the low power state;
wherein the USB device is operable to receive the sideband signal from the computer system over the sideband signal line while the USB device is in a low power state;
wherein the USB device is operable to electrically reconnect to the computer system over the USB communication medium when the USB device receives the sideband signal; and
wherein the USB communication medium is configured to communicate USB signals between the USB device and the computer system.

18. The method of claim 3, further comprising:
the USB device electrically disconnecting from the computer system over a USB communication medium prior to the USB device entering the low power state; and
the USB device electrically reconnecting to the computer system over the USB communication medium when the USB device receives the sideband signal from the computer system over a sideband signal line triggering the USB device to enter the normal power state; and
wherein the USB communication medium is configured to communicate USB signals between the USB device and the computer system.

19. The method of claim 3, wherein while the USB device is in the low power state, the USB device does not cause system activity on a Peripheral Component Interconnect (PCI) bus of the computer system.

20. The method of claim 9, further comprising:
the USB device electrically disconnecting from the computer system over a USB communication medium prior to the computer system entering the low power state; and
the computer system electrically reconnecting to the USB device over the USB communication medium when the computer system receives the sideband signal from the USB device over a sideband signal line triggering the computer system to enter the normal power state; and
wherein the USB communication medium is configured to communicate USB signals between the USB device and the computer system.

21. The method of claim 9, wherein while the USB device is in the low power state, the USB device does not cause system activity on a Peripheral Component Interconnect (PCI) bus of the computer system.

22. The apparatus of claim 1, wherein the second medium comprises a wireless medium.

23. The apparatus of claim 1, wherein the second medium comprises a radio frequency medium.

24. The method of claim 3, wherein the first medium comprises a wireless medium.

25. The method of claim 3, wherein the first medium comprises a radio frequency medium.

26. The method of claim 9, wherein the first medium comprises a wireless medium.

27. The method of claim 9, wherein the first medium comprises a radio frequency medium.

28. The apparatus of claim 15, wherein the sideband signal line comprises a wireless medium.

29. The apparatus of claim 15, wherein the sideband signal line comprises a radio frequency medium.

* * * * *